United States Patent [19]

Swayze

[11] Patent Number: 5,218,390
[45] Date of Patent: Jun. 8, 1993

[54] COMPACT CAMERA WITH INTEGRAL BODY GRIP

[75] Inventor: Samuel F. Swayze, Fairport, N.Y.

[73] Assignee: Eastman Kodak Company, Rochester, N.Y.

[21] Appl. No.: 685,349

[22] Filed: Apr. 15, 1991

[51] Int. Cl.⁵ .................. G03B 29/00; G03B 17/02; G03B 17/38
[52] U.S. Cl. .................. 354/82; 354/266; 354/288
[58] Field of Search .............. 354/82, 288, 266, 173.1; D16/200, 209, 218

[56] References Cited

U.S. PATENT DOCUMENTS

| | | | |
|---|---|---|---|
| D. 268,416 | 3/1983 | Rubner | D16/6 |
| D. 296,551 | 7/1988 | Mizogui | D14/78 |
| 2,000,588 | 5/1935 | Fuerst | 354/288 |
| 4,052,729 | 10/1977 | Douglas | 354/86 |
| 4,493,542 | 1/1985 | Ohmura et al. | 354/82 |
| 4,918,477 | 4/1990 | Matsuda et al. | 354/288 |

*Primary Examiner*—Michael L. Gellner
*Assistant Examiner*—J. K. Han
*Attorney, Agent, or Firm*—Roger A. Fields

[57] ABSTRACT

A photographic camera comprises a camera body having its height greater than its width, its depth less than its width, and a lowermost internal chamber which extends a substantial amount of the width and the depth for storing relatively heavy components such as batteries and an electric motor to concentrate the mass proximate the bottom of the camera body. A front face of the camera body includes a longitudinal indentation located above the chamber which extends a substantial amount of the width to receive similar right- and left-hand fingers of a photographer whereby the photographer can readily grip the camera body in the vicinity of the chamber.

4 Claims, 4 Drawing Sheets

COMPACT CAMERA WITH INTEGRAL BODY GRIP

BACKGROUND OF THE INVENTION

1. Field of the Invention

The invention relates generally to the field of photography, and in particular to a compact camera with an integral body grip.

2. Description of the Prior Art

Compact cameras have been proposed wherein the camera body has its height greater than its width, its depth less than its width, and a lowermost internal chamber which extends a substantial portion of the width and the depth for storing relatively heavy components such as batteries and an electric motor to concentrate the mass proximate the bottom of the camera body. When taking a picture, however, the photographer may find some difficulty in getting a firm grip on the camera body to avoid camera shake.

SUMMARY OF THE INVENTION

A photographic camera comprises a camera body having its height greater than its width, its depth less than its width, and a lowermost internal chamber which extends a substantial amount of the width and the depth for storing relatively heavy components such as batteries and an electric motor to concentrate the mass proximate the bottom of the camera body. A front face of the camera body includes a longitudinal indentation located above the chamber which extends a substantial amount of the width to receive similar right- and left-hand fingers of a photographer whereby the photographer can readily grip the camera body in the vicinity of the chamber.

DETAILED DESCRIPTION OF THE PREFERRED EMBODIMENT

The invention is disclosed in connection with a compact 35 mm camera having a built-in, flip-up electronic flash unit. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
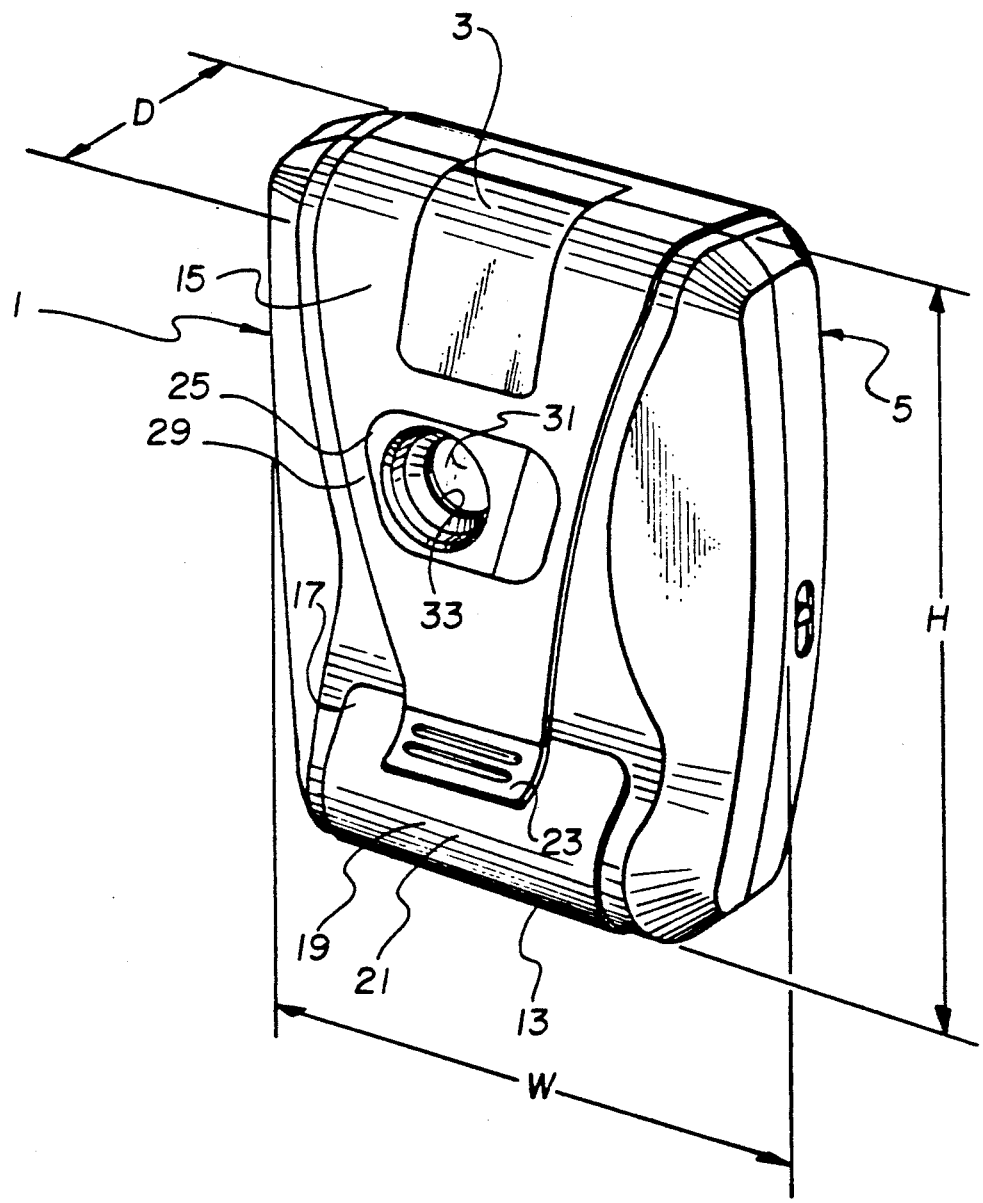
FIG. 1 is a front perspective view of a compact camera according to a preferred embodiment of the invention, showing the compact camera with a flip-up flash unit in a folded storage position.
Figure 2:
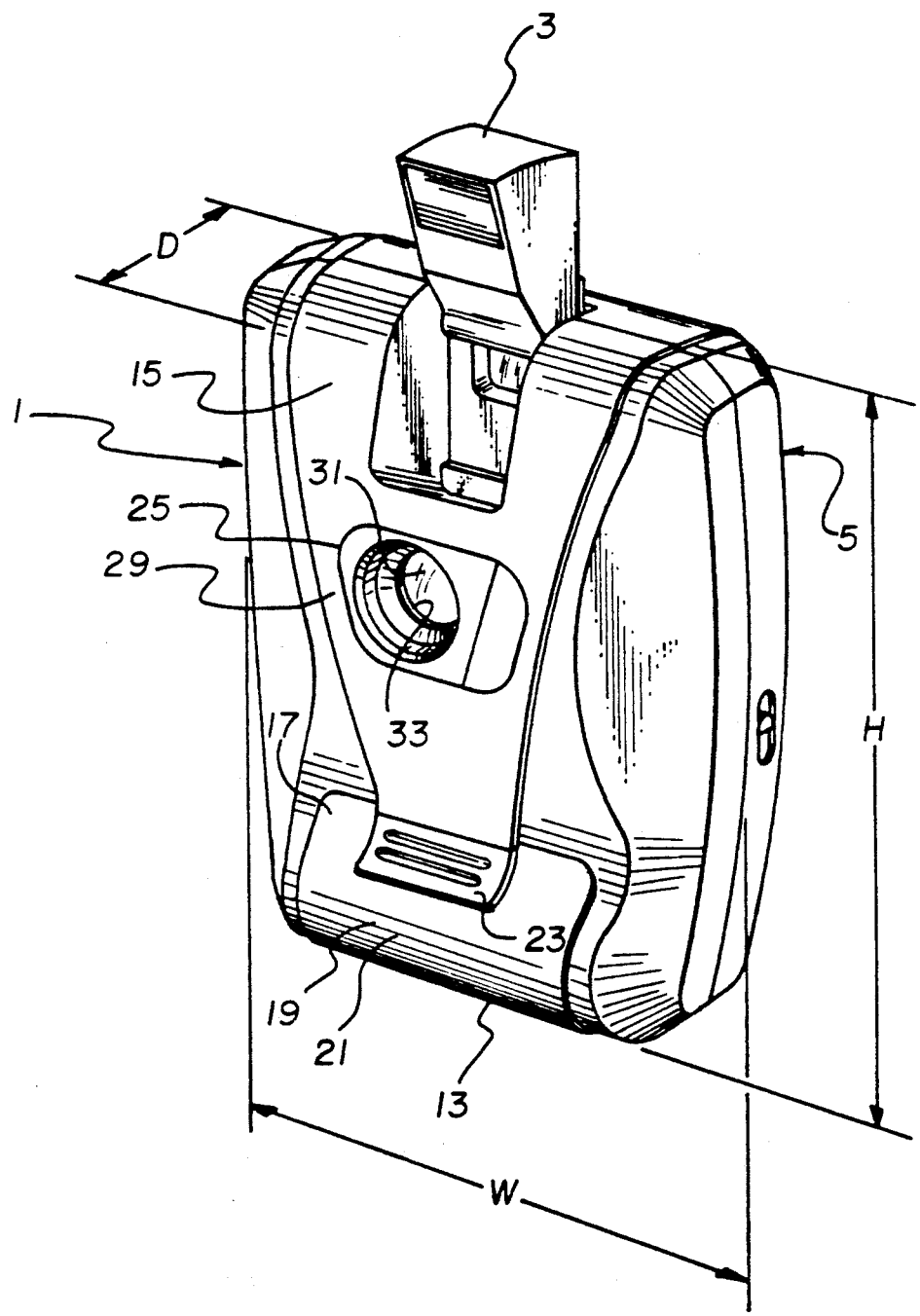
FIG. 2 is a view similar to FIG. 1, showing the flash unit flipped-up to an operative position.
Figure 3:
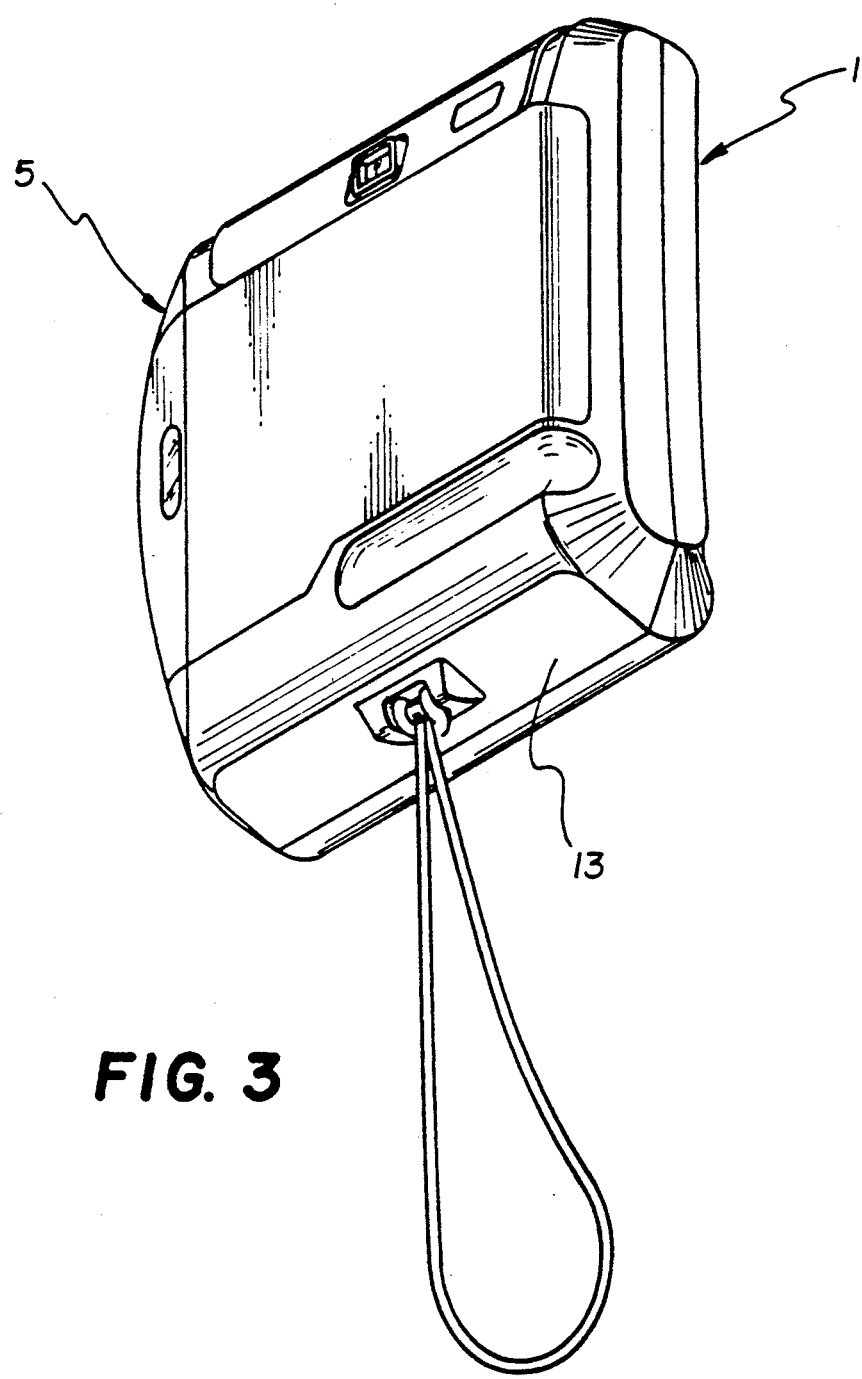
FIG. 3 is a rear perspective view of the compact camera with the flash unit in its operative position.
Figure 4:
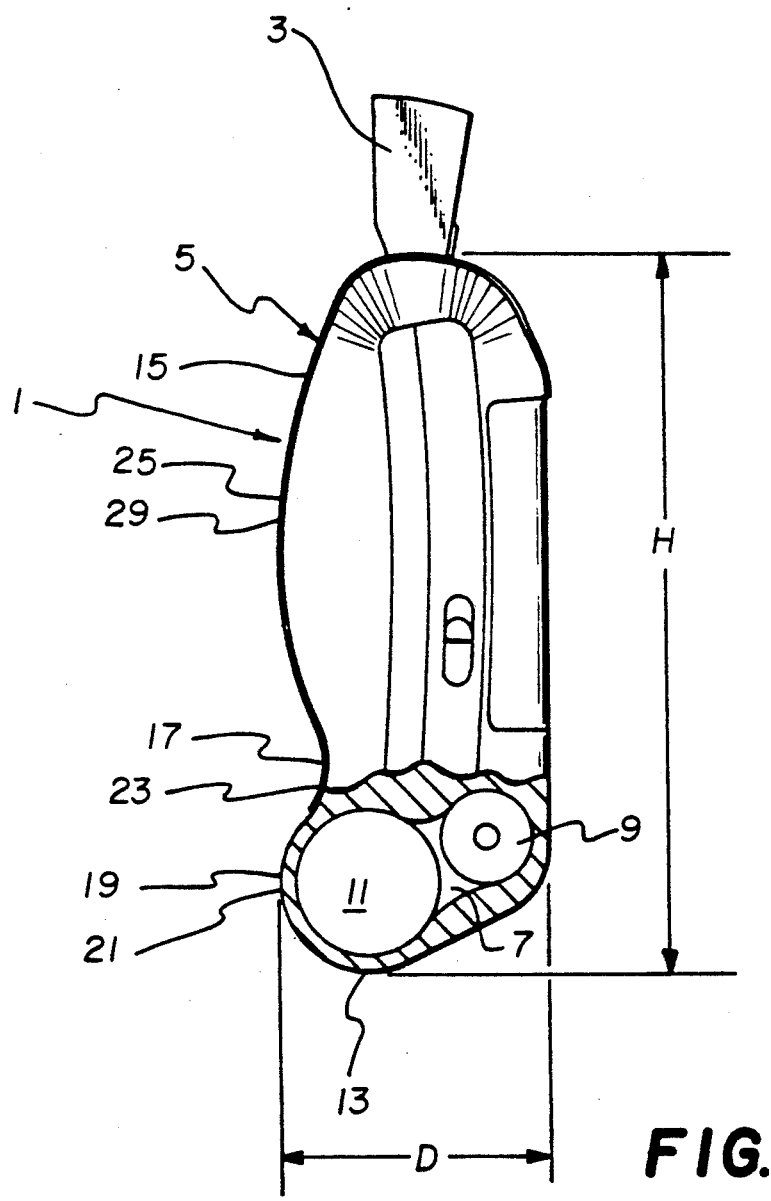
FIG. 4 is a side elevation view of the compact camera partly cut open to show a lowermost internal chamber including an electric motor and batteries.

Referring now to the drawings, FIGS. 1 and 2 depict a compact 35 mm camera 1 with a built-in, flip-up electronic flash unit 3 shown in a folded storage position and flipped-up to an operative position. The camera body 5 has its height H greater than its width W, its depth D less than its width, and a lowermost internal chamber 7 which extends a substantial amount of the width and the depth for storing relatively heavy components such as batteries 9 and an electric motor 11 to concentrate the mass proximate the bottom 13 of the camera body. See FIGS. 3 and 4. A front face 15 of the camera body 5 includes a longitudinal indentation 17 located above the chamber 7 which extends a substantial amount of the width W to create the appearance of a bulge 19 at a lowermost portion 21 of the front face opposite the chamber. The longitudinal indentation 17 is dimensioned to receive similar right- and left-hand fingers of a photographer whereby the photographer can readily grip the camera body 5 in the vicinity of the chamber 7. A shutter release button 23 is centered within the longitudinal indentation 17. The front face 15 is tapered to reduce the depth of the camera body 5 gradually from a substantially central portion 25 of the front face located above the longitudinal indentation 17 to an uppermost portion 27 of the front face to create the appearance of a bulge 29 at the central portion. A taking lens 31 is fixed within a centered opening 33 in the central portion 25.

The invention has been described with reference to a preferred embodiment. However, it will be appreciated that variations and modifications can be effected within the ordinary skill in the art without departing from the scope of the invention.

I claim:

1. A photographic camera comprises a camera body having its height greater than its width, its depth less than its width, and a lowermost internal chamber which extends a substantial amount of the width and the depth for storing relatively heavy components such as batteries and an electric motor to concentrate the mass proximate the bottom of said camera body, is characterized in that:

a front face of said camera body includes a single longitudinal indentation located immediately above said chamber which extends a substantial amount of the width to create the appearance of a bulge at a lowermost portion of the front face directly opposite the chamber, said front face being tapered to reduce the depth of said camera body gradually from a substantially central portion of the front face located above said longitudinal indentation to an uppermost portion of a front face to create the appearance of a bulge at said central portion; and a taking lens is fixed within a centered opening in said central portion.

2. A photographic camera as recited in claim 1, wherein said longitudinal indentation is dimensioned to receive similar right- and left-hand fingers of a photographer whereby the photographer can readily grip said camera body in the vicinity of said chamber.

3. A photographic camera as recited in claim 1 or 2, wherein a shutter release button is centered along said longitudinal indentation.

4. A photographic camera comprises a camera body having a lowermost internal chamber for storing relatively heavy components such as batteries and an electric motor to concentrate the mass proximate the bottom of said camera body, is characterized in that:

a front face of said camera body includes a single indentation located immediately above said chamber and at least coextensive with the chamber which is dimensioned to receive similar right- and left-hand fingers of a photographer, to allow the photographer to readily grip the camera body immediately above the chamber for the length of the chamber; and a shutter release button is centered along said indentation.

* * * * *